United States Patent [19]

Weiler

[11] Patent Number: 4,817,834
[45] Date of Patent: Apr. 4, 1989

[54] BUMPER MOUNTED SPARE WHEEL CARRIER

[76] Inventor: Raywood C. Weiler, 34-400 Cathedral Canyon Dr., #178, Palm Springs, Calif. 92234

[21] Appl. No.: 15,535

[22] Filed: Feb. 13, 1987

Related U.S. Application Data

[63] Continuation of Ser. No. 778,533, Sep. 20, 1985, abandoned.

[51] Int. Cl.⁴ ............................................. B62D 43/02
[52] U.S. Cl. ................................ 224/42.06; 224/42.21
[58] Field of Search ............... 224/42.21, 42.12, 42.24, 224/42.19, 42.26, 42.28, 42.29, 42.06

[56] References Cited

U.S. PATENT DOCUMENTS

| | | |
|---|---|---|
| 2,698,118 | 12/1954 | Dickason . |
| 2,711,273 | 6/1955 | Stromberg ........................ 224/42.21 |
| 3,326,434 | 6/1967 | Cheadle ............................ 224/42.21 |
| 3,343,736 | 9/1967 | Sellers .............................. 224/42.21 |
| 3,371,832 | 3/1968 | Sekino et al. . |
| 3,669,326 | 6/1972 | Podraza . |
| 3,700,130 | 10/1972 | Holdread . |
| 3,822,814 | 7/1974 | Baldi . |
| 3,866,777 | 2/1975 | Staranick et al. . |
| 4,140,255 | 2/1979 | Weiler . |
| 4,679,717 | 7/1987 | Hansen ............................. 224/42.06 |
| 4,767,038 | 8/1988 | McVicar ........................... 224/42.06 |

Primary Examiner—Ernest G. Cusick
Attorney, Agent, or Firm—Wood, Dalton, Phillips, Mason & Rowe

[57] ABSTRACT

A bumper mounted spare wheel carrier for a vehicle having a rear door is provided with a latching mechanism for latching the carrier to the rear door of the vehicle so as to secure it during movement. The carrier has a first mounting bracket secured to the rear bumper and a second mounting bracket secured to the rear door of the vehicle. A carrier arm is mounted on the first mounting bracket and is adapted for pivotal movement between a first position latched to the second mounting bracket and a second position extending substantially laterally from the vehicle. A wheel bracket is attached to the carrier arm for holding the wheel. The latching mechanism, also mounted on the carrier arm, is adapted for engagement with the second mounting bracket. As a result, a low cost easy to install bumper mounted wheel carrier is provided which is firmly attached to the vehicle, yet can be easily swung away from the vehicle for removal of the spare wheel or for opening of the rear door.

16 Claims, 3 Drawing Sheets

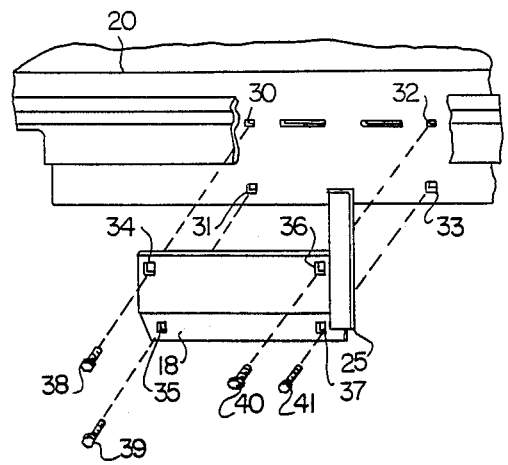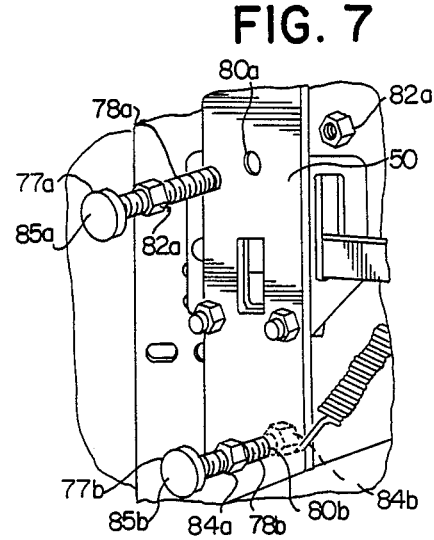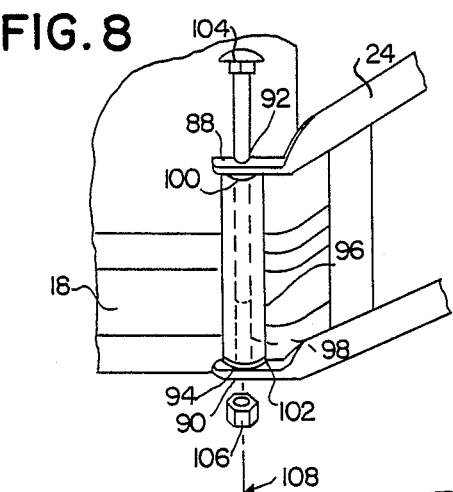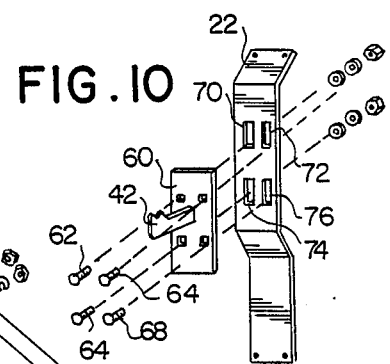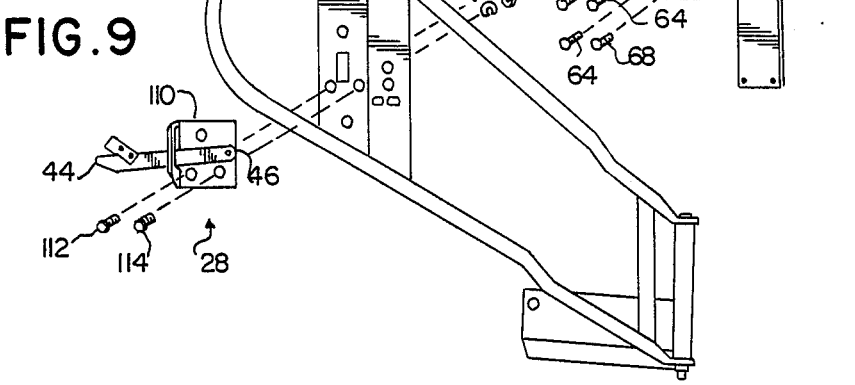

BUMPER MOUNTED SPARE WHEEL CARRIER

This application is a continuation of application Ser. No. 778,533, filed Sept. 2, 1985, abandoned.

BACKGROUND OF THE INVENTION

The present invention relates to spare wheel carriers for vehicles and more particularly to wheel carriers adapted to be mounted on the rear bumper of a vehicle having a rear door, such as a General Motors Mini-Blazer or Ford Bronco II.

The prior art discloses the concept of mounting a spare wheel carrier on the bumper of a vehicle. In addition, the prior art discloses a spare wheel carrier in which the wheel is supported both by the rear door of the vehicle and by the bumper. Examples of such known prior art devices include U.S. Pat. No. 3,822,814, Baldi; U.S. Pat. No. 2,698,118, Dickason; U.S. Pat. No. 3,371,832, Sekin et al.; U.S. Pat. No. 3,669,326, Podraza; U.S. Pat. No. 3,866,777, Staranick et al.; and, U.S. Pat. No. 3,700,130, Holdread. However, a problem has been found with the above-mentioned spare wheel carriers in that those supported exclusively by the bumper tend to cause excessive vibration and that those attached to the rear door tended to damage the rear door during use of the vehicle.

Accordingly, it is an object of the present invention to provide a spare wheel carrier which is principally supported on the rear bumper of a vehicle, but which has means for damping the vibration of the wheel carrier against the rear door of the vehicle.

It is an additional object of the present invention to provide a spare wheel carrier that can be mounted on a variety of bumper designs and door configurations.

It is a further object of the present invention to provide a spare wheel carrier which pivots out of the path of the rear door of the vehicle so as to facilitate the opening thereof and the removal of the tire from the spare wheel carrier.

SUMMARY OF THE INVENTION

The present invention relates generally to spare wheel carriers for vehicles and in particular to a spare wheel carrier mounted on the rear bumper of a vehicle.

The spare wheel carrier of the present invention is mounted on the rear bumper of a vehicle by means of a first mounting bracket. The device differs from prior art wheel carriers in that a second mounting bracket is adapted to be secured to the rear door of the vehicle. An arm mounted at one end of the first mounting bracket is adapted for pivotal movement between a first position next to the door and a second position extending laterally away from the vehicle and out of the way of the door. As a result, the door may be selectively opened or closed without hindrance from the wheel carrier. A latching mechanism selectively latches the arm to the second mounted bracket on the door thereby securing the wheel and carrier arm to the door during movement of the vehicle.

A particular feature of the invention is the use of a bumper mechanism which is juxtaposed between the second mounting bracket and the carrier arm, which dampens vibration of the carrier arm during operation of the vehicle.

BRIEF DESCRIPTION OF THE DRAWINGS

FIG. 6 of the drawings is a front perspective view of the rear bumper of FIG. 1 showing in particular a mounting bracket secured to the rear bumper and having a pivot tube extending vertically therefrom.

FIG. 7 of the drawings is a rear perspective view of the bumper mechanism for the spare wheel carrier of FIG. 1 of the drawings.

FIG. 8 of the drawings is a front view of the pivotal mounting mechanism for the carrier arm of the spare wheel carrier of FIG. 1 of the drawings.

FIG. 9 of the drawings is a front assembly view of the carrier arm of FIG. 1 of the drawings showing in particular a latch lever assembly adapted for attachment to the carrier arm.

FIG. 10 of the drawings is a front perspective view of the second mounting bracket and hook assembly of FIG. 1 of the drawings.

DETAILED DESCRIPTION OF THE PREFERRED EMBODIMENT

Figure 1:
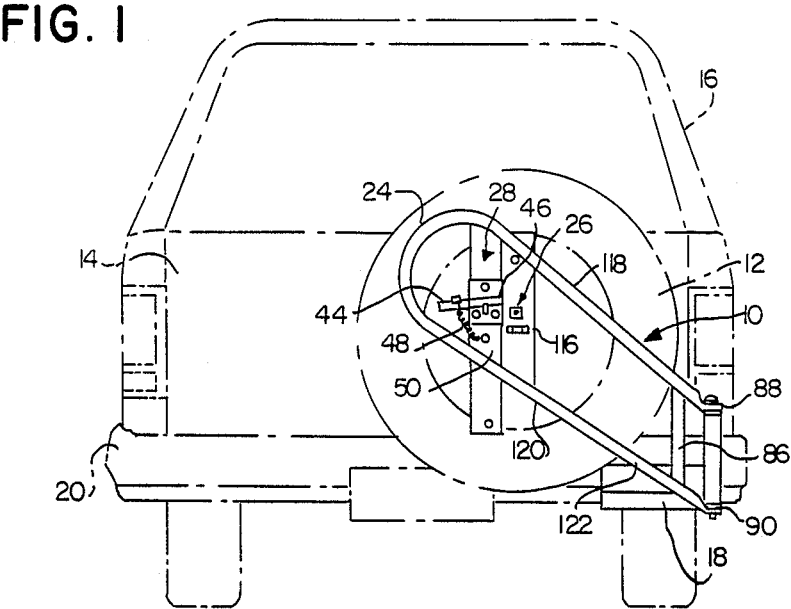
FIG. 1 of the drawings is a rear view of the spare wheel carrier mounted on the rear bumper of a vehicle.

While this invention is susceptible of an embodiment in many different forms, there is shown in the drawings and will herein be described in detail, several specific embodiments with the understanding that embodiments illustrated are an exemplification of the principles of the invention and are not intended to limit the invention to the embodiments illustrated.

As seen in FIG. 1 of the drawings, a spare wheel carrier 10 is provided for carrying wheel 12 on the rear door 14 of vehicle 16. Wheel carrier 10 is supported by first mounting bracket 18, which is secured to rear bumper 20 of vehicle 16.

Figure 2:
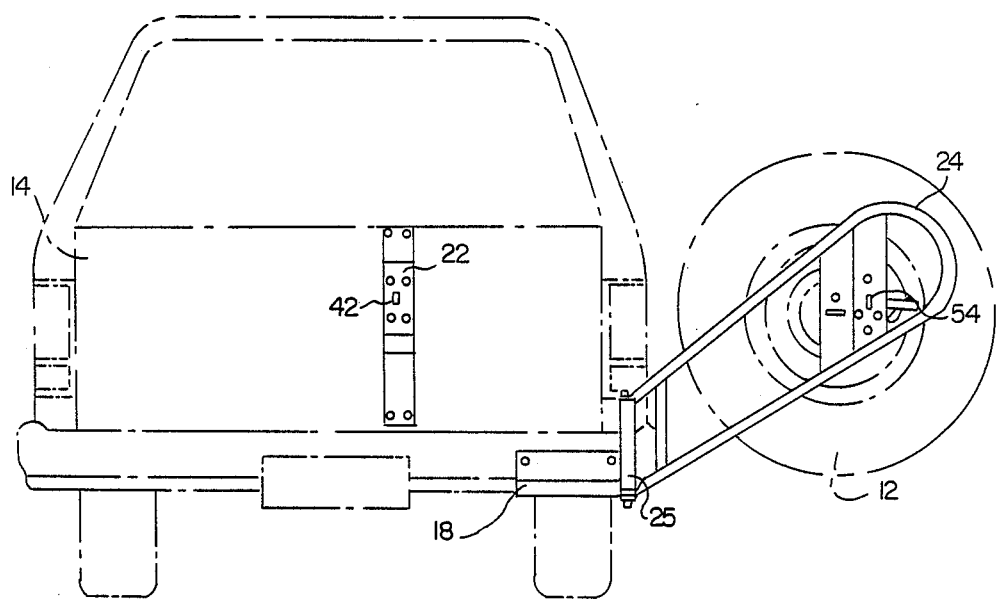
FIG. 2 of the drawings is a rear view of the spare wheel carrier of FIG. 1 showing in particular the carrier arm extended laterally away from the vehicle so as to allow opening of the rear door of the vehicle.
Figure 3:
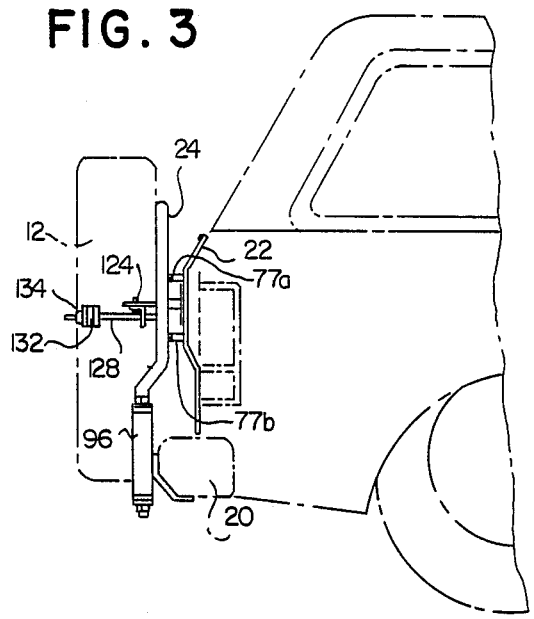
FIG. 3 of the drawings is a side view of the spare wheel carrier of FIG. 1 showing in particular the mounting of the carrier on the rear bumper and rear door of the vehicle.

As best seen in FIG. 2 of the drawings, a second mounting bracket 22 is secured to rear door 14 of vehicle 16. Carrier arm 24 is pivotally mounted on first end 25 of first mounting bracket 18. Carrier arm 24 is constructed and arranged for movement between a first position adjacent second mounting bracket 22, and a second position, best seen in FIG. 2, extending laterally from vehicle 16. As a result, wheel carrier 10 can be easily pivoted for opening of rear door 14 or removal of wheel 12. As seen in FIG. 1, tire mounting bracket 26 is further provided for mounting wheel 12 on carrier arm 24. A latching mechanism 28 selectively latches carrier arm 24 to second mounting bracket 22 and consequently to the door 14 of the vehicle. As a result, carrier arm 24 may be selectively secured to door 14 when desired.

As best seen in FIG. 6 of the drawings, rear bumper 20 has a series of bolt holes 30, 31, 32 and 33 sequentially arrayed along its length. A series of mating bolt holes 34, 35, 36 and 37 are positioned on first mounting bracket 18 for alignment with bolt holes 30, 31, 32 and 33. Bolts 38, 39, 40 and 41 are adapted for extension through bolt holes 34, 35, 36 and 37 and into bolt holes 30, 31 32 and 33. As a result, first mounting bracket 18 may be secured to rear bumper 20.

Figure 4:
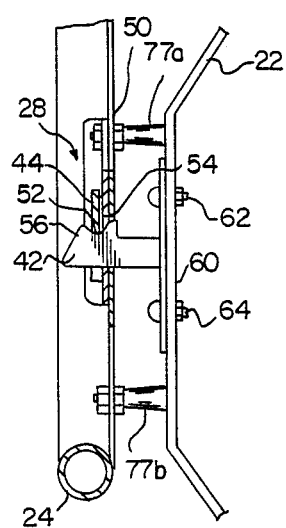
FIG. 4 of the drawings is a side view, partially cut away, of the central portion of the spare wheel carrier of FIG. 1 showing in particular a latching mechanism for affixing the carrier arm to the mounting bracket on the door.

As best seen in FIG. 4 of the drawings, latching mechanism 28 is used for latching arm 24 to second mounting bracket 22. Latching mechanism 28 comprises a hook member 42 extending substantially perpendicularly from second mounting bracket 22. As best seen in FIG. 1, latch lever arm 44 is pivotally mounted on latch pin 46. Latch lever 44 is spring-biased by means of spring 48 which extends between latch lever arm 44 and carrier arm face plate 50 on carrier arm 24. Returning to FIG. 4, latch lever 44 may be raised so as to disengage from the notched portion 52 of hook member 42. When carrier arm 24 is adjacent to tailgate 14, hook member 42 extends through aperture 54 in face plate 50. Thus carrier arm 24 may be pivoted against second mounting bracket 22, so that hook member 42 engages latch lever 44. In particular an angled leading edge 56 of hook member 42 strikes latch lever 44 causing it to raise upward and to fall into notched portion 52 thereby fixedly positioning carrier arm 24 relative to rear door 14.

As further seen in FIG. 10, hook member 42 extends perpendicularly from hook bracket plate 60, which is attached by means of bolts 62, 64, 66 and 68 to second mounting bracket 22. It should be noted in this regard that hook bracket plate 60 is adjustable in position on second mounting bracket 22. Bolts 62, 64, 66, and 68 extend through apertures 70, 72, 74 and 76 formed in mounting bracket 22, best seen in FIG. 10. Apertures 70, 72, 74, and 76 are substantially longitudinal slots in second mounting bracket 22 which allows hook bracket plate 60 to be raised or lowered in order to position hook 42 for firm engagement with latch lever 44.

Figure 5:
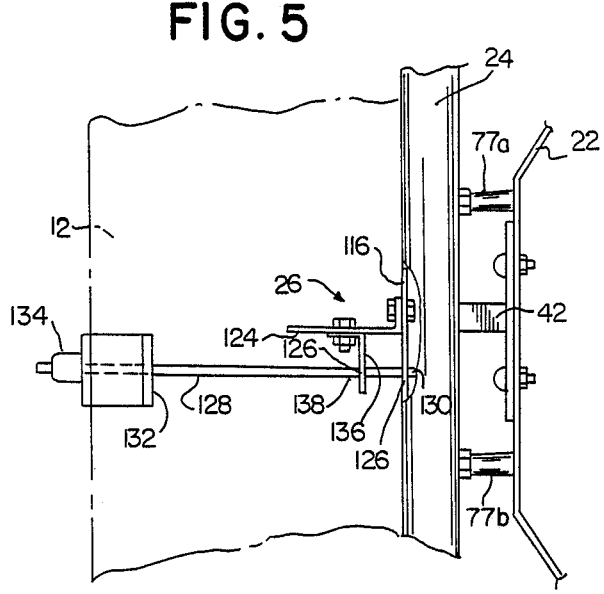
FIG. 5 of the drawings is a side view, partially broken away, of the central portion of the spare wheel carrier of FIG. 1 showing in particular the mechanism provided for attaching the spare wheel itself to the carrier arm.

As seen in FIGS. 5 and 7 of the drawings, one of the key features of the invention are bumpers 77a and 77b which extend from carrier face plate 50 for abutment against second mounting bracket 22. Bumpers 77a and 77b comprise threaded rods 78a and 78b, which are sized for threaded insertion into apertures 80a and 80b in carrier face plate 50. A pair of nuts 82a and 82b are positioned on threaded rod 78a, on opposite sides of face plate 50 for securing bumper 77a thereon. Bumper 77a may be adjustably positioned through movement of nuts 82a and 82b. Similarly, bumper 77b has threaded nuts 84a and 82b threadedly positioned thereon so as to secure bumper 77b to face plate 50. As a result bumpers 77a and 77b, as seen in FIG. 4, may be extended from face plate 50 the precise distance necessary to be in compression against second mounting bracket 22 when latch lever 44 is fixedly secured in slot 52 on hook member 42. Telescopically attached to threaded rods 78a and 78b are rubber bumper caps 85a and 85b which provide the cushioning required to cushion spare wheel carrier 10 during movement of vehicle 16.

As further seen in FIGS. 1 and 2 of the drawings, in a preferred embodiment carrier arm 24 is constructed from a curved substantially C-shaped tubular steel. A structural support member 86 extends between distal ends 88 and 90 of carrier arm 24. In the embodiment shown structural support member 86 is welded onto carrier arm 24. Distal ends 88 and 90 are flattened and have a centrally positioned aperture 92 and 94, (best seen in FIG. 8), extending therethrough.

As further seen in FIG. 8, first mounting bracket 18 has a vertically mounted pivot tube 96 extending therefrom, mounted substantially in parallel to bumper 20. Tube 96 has a lumen 98 extending therethrough. Inserted into apertures 92 and 94 are drilled end bushings 100 and 102. Distals ends 88 and 90 of carrier arm 24 are placed over bushings 100 and 102 and carriage bolt 104 is inserted through distal end 88, through bushing 100, and through lumen 98. Carriage bolt 104 extends through bushing 102 and out of distal end 90 of carrier arm 24. An elastic nut 106 is then threadedly attached to the end of carriage bolt 104. As a result, carrier arm 24 may be pivoted about axis 108. In a first position carrier arm 24 abuts against rear door 14 of vehicle 16. In a second position carrier arm 24 extends laterally from vehicle 16 and out of the way of rear door 14. It should be noted in this regard, that unlike other prior art spare wheel carriers, vertical axis 108 is substantially parallel with the side of vehicle 16 so as allow easy clearance of rear door 14. In addition, the extreme lateral position of carrier arm 24 allows wheel 12 to be easily removed from carrier arm 24 while safely to the side of the vehicle.

As best seen in FIG. 9 of the drawings, latch assembly 28 comprises a latch plate member 110 which is fixedly attached to carrier arm face plate 50. Latch plate member 110 has spring biased latch lever arm 44 pivotally mounted thereon, on pin 46. Latch lever plate 110 is preferably attached to carrier arm face plate 50 by means of bolts 112 and 114. As a result the latch lever assembly 28 may be manufactured as a separate subassembly, and assembled by the user when installing the carrier device 10 on vehicle 16.

As seen in FIGS. 1 and 5, spare wheel carrier 10 is adapted for carrying wheel 12. Wheel 12 is specifically attached to carrier arm 24 by means of tire mounting mechanism 26. More specifically, carrier arm 24 has a tire carrying plate 116 which extends substantially vertically between first portion 118 and second portion 120 of C-shaped tubular member 122. As best seen in FIG. 5, fixedly attached to tire carrier plate 116 is mounting bracket 124. Tire carrying plate 116 and mounting bracket 124 have respectively eye bolt holes 126. Extending through eye bolt holes 126 is eye bolt 128. Eye bolt 128 is hooked at end 130 for mating engagement with one of the eye bolt holes 126. Eye bolt 128 in turn extends through wheel 12 and through retainer bracket 132. A wing nut 134 is threadedly attached to eye bolt 128 so as to fixedly retain wheel 12 on carrier 10. As further seen in FIG. 5, a support bracket 136 extends downwardly from tire mounting bracket 124 and is attached thereto. Downwardly extending bracket 136 has an aperture 138 extending therethrough for reception and support of eye bolt 128.

The foregoing description and drawings merely explain and illustrate the invention and the invention is not limited thereto except insofar as those who have the disclosure before them will be able to make modifications and variations therein without departing from the scope of the invention.

What is claimed is:

1. A spare wheel carrier for a vehicle comprising:

a first mounting bracket adapted to be secured to a rear bumper of said vehicle;

a second mounting bracket adapted to be secured to a rear door of said vehicle;

an arm mounted on said first mounting bracket and adapted for pivotal movement between a first position in non-contacting adjacent relation to said second mounting bracket and a second position extending substantially laterally from said vehicle to a point remote from said second mounting bracket;

means for mounting a wheel on said arm;

means for selectively latching said arm to said second mounting bracket when said arm is in said first position at a point in spaced relation to said rear door of said vehicle, said arm being maintained in non-contacting adjacent relation to said second mounting bracket by said latching means at said point in spaced relation to said rear door of said vehicle;

discrete resilient means disposed between said arm and said second mounting bracket for maintaining said arm in non-contacting adjacent relation to said second mounting bracket when said arm is latched to said second mounting bracket; and means for adjusting the distance between said arm and said second mounting bracket when said arm is latched to said second mounting bracket to ensure that said discrete resilient means acts to bias said arm in a direction away from said second mounting bracket thereby causing said arm to be latched to said second mounting bracket in a vibration isolating manner.

2. The spare wheel carrier of claim 1 wherein said means for selectively latching said arm to said second mounting bracket comprises:
a hook member attached to and extending substantially perpendicularly from said second mounting bracket; and,
a spring biased latch lever pivotally mounted on said arm and adapted for selective engagement with said hook member so as to fixedly position said arm and thereby said wheel relative to said vehicle.

3. The spare wheel carrier of claim 2 wherein said means for selectively latching said arm to said second mounting bracket comprises a hook bracket member attachable to said second mounting bracket, said hook bracket member being selectively movable on said second mounting bracket and extending substantially perpendicularly therefrom so as to allow selective adjustment of the position of said hook bracket member relative to said spring biased latch lever, said selectively movable hook bracket member comprising at least a part of said means for adjusting the distance between said arm and said second mounting bracket when said arm is latched to said second mounting bracket.

4. The spare wheel carrier of claim 3 and further comprising a latch plate member having said spring biased latch lever mounted thereon, said latch plate member being fixedly attached to said arm, said spring biased latch lever being adapted for interaction with said hook member so as to selectively latch said arm to said second mounting bracket.

5. The spare wheel carrier of claim 2 wherein said hook member includes a plurality of ledges integrally formed thereon and positioned for mating engagement with said latch lever so as to prevent inadvertent disengagement of said hook member from said latch lever.

6. The spare wheel carrier of claim 1 wherein said discrete resilient means comprises bumper means attached to said arm and adapted for abutment against said second mounting bracket, said bumper means being effective to maintain said arm in non-contacting relation to said second mounting bracket.

7. The spare wheel carrier of claim 6 wherein said bumper means comprise:
one or more threaded rods extending substantially perpendicularly from said arm;
a pair of threaded nut members disposed on each of said threaded rods and adapted for securing said threaded rods on said arm; and
a rubber bumper cap telescopically engaged to one end of each of said threaded rods for resilient engagement with said second mounting bracket.

8. The spare wheel carrier of claim 1 wherein said arm comprises:
a curved substantially C-shaped tubular steel member;
a structural support member extending between the distal ends of said C-shaped member; and,
pivotal mounting means pivotally mounting said arm to said first mounting bracket.

9. The spare wheel carrier of claim 8 wherein said pivotal mounting means comprises:
a tubular arm support member extending vertically from one end of said first mounting bracket;
a pair of parallel flanges extending from said arm and spaced apart so as to matingly engage said tubular arm support member, each of said flanges having an aperture extending axially therethrough;
a carriage bolt member extending through said flanges and said tubular arm support member; and,
bushing means extending into said tubular arm support member for facilitating rotation of said carriage bolt member in said tubular arm support member and thereby facilitating pivotal movement of said arm toward or away from said vehicle.

10. The spare wheel carrier of claim 1 wherein means for mounting a wheel on said arm comprises:
a wheel carrier bracket mounted on said arm;
an eye bolt member adapted for extension through a hub of said wheel;
a retainer bracket adapted for abutment with said hub of said wheel, said retainer bracket having an aperture extending therethrough adapted for telescopic reception of said eye bolt member; and,
a wing nut adapted for threaded engagement with said eye bolt member and abutment against said retainer bracket so as to retain said wheel on said arm.

11. The spare wheel carrier of claim 1 wherein said rear bumper of said vehicle has a plurality of bolt holes, and
said first mounting bracket is shaped so as to substantially conform to the configuration of said rear bumper of said vehicle, said first mounting bracket further having a plurality of bolt apertures sized and positioned to correspond to said bolt holes in said rear bumper.

12. In combination, a vehicle including a vehicle body having a door opening therein and a door hingedly mounted on said body and arranged to be moved between positions closing said door opening and uncovering said door opening, a spare wheel carrier hingedly mounted on a bumper of said vehicle and including an arm arranged to be swung between a position adjacent the exterior of said door and a position remote therefrom, said spare wheel carrier including a mounting bracket secured to said door, said arm being movable to a non-contacting adjacent position relative to said mounting bracket, said spare wheel carrier also including means for selectively latching said arm to said mounting bracket at a point in spaced relation to said rear door of said vehicle while said arm is maintained in said non-contacting adjacent position relative to said mounting bracket by said latching means at said point in spaced relation to said rear door of said vehicle, discrete resilient means disposed between said arm and said mounting bracket for maintaining said arm in said non-contacting adjacent position relative to said mounting bracket when said arm is latched to said mounting bracket, and means for adjusting the distance between said arm and said mounting bracket to ensure that said discrete resilient means acts to bias said arm in a direction away from said mounting bracket thereby causing said arm to be latched to said mounting bracket in a vibration isolating manner, whereby said spare wheel carrier may be pivoted to a position laterally disposed from said vehicle and said door opened without obstruction and said arm can otherwise be latched to said mounting bracket so as to dampen vibration of said spare wheel carrier during operation of said vehicle.

13. The spare wheel carrier of claim 12 wherein said discrete resilient means includes bumper means having means for adjusting the position thereof, said discrete resilient means position adjusting means comprising at least a part of said means for adjusting the distance between said arm and said mounting bracket when said arm is latched to said mounting bracket.

14. The spare wheel carrier of claim 13 wherein said bumper means comprises:
   one or more threaded rods threadedly attached to and extending substantially perpendicularly from said arm;
   one or more rubber bumper caps telescopically engaged with said one or more threaded rods; and,
   nut means for adjustably fixing the position of said one or more threaded rods relative to said arm.

15. The spare wheel carrier of claim 12 including another mounting bracket affixed to said bumper proximate one end thereof, said another mounting bracket allowing pivoting of said arm out of the path of travel of said door when opened.

16. The spare wheel carrier of claim 12 wherein said arm comprises a substantially C-shaped tubular steel member.

* * * * *